United States Patent
Liu et al.

(10) Patent No.: US 11,537,884 B2
(45) Date of Patent: Dec. 27, 2022

(54) MACHINE LEARNING MODEL TRAINING METHOD AND DEVICE, AND EXPRESSION IMAGE CLASSIFICATION METHOD AND DEVICE

(71) Applicant: Tencent Technology (Shenzhen) Company Limited, Shenzhen (CN)

(72) Inventors: Longpo Liu, Shenzhen (CN); Wei Wan, Shenzhen (CN); Qian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 471 days.

(21) Appl. No.: 16/735,236

(22) Filed: Jan. 6, 2020

(65) Prior Publication Data
US 2020/0143248 A1 May 7, 2020

Related U.S. Application Data

(63) Continuation of application No. PCT/CN2018/090676, filed on Jun. 11, 2018.

(30) Foreign Application Priority Data

Jul. 12, 2017 (CN) .......................... 201710566325.X

(51) Int. Cl.
*G06V 10/82* (2022.01)
*G06N 3/08* (2006.01)
*G06K 9/62* (2022.01)

(52) U.S. Cl.
CPC ............. *G06N 3/08* (2013.01); *G06K 9/6259* (2013.01); *G06K 9/6277* (2013.01)

(58) Field of Classification Search
None
See application file for complete search history.

(56) References Cited

U.S. PATENT DOCUMENTS

| | | | | |
|---|---|---|---|---|
| 2011/0170769 | A1* | 7/2011 | Sakimura | G06K 9/623 382/159 |
| 2015/0098646 | A1 | 4/2015 | Paris et al. | |

(Continued)

FOREIGN PATENT DOCUMENTS

| | | |
|---|---|---|
| CN | 103489009 A | 1/2014 |
| CN | 104111931 A | 10/2014 |

(Continued)

OTHER PUBLICATIONS

Li, Huibin, et al. "Multimodal 2D+ 3D facial expression recognition with deep fusion convolutional neural network." IEEE Transactions on Multimedia 19.12 (2017): 2816-2831. (Year: 2017).*

(Continued)

*Primary Examiner* — Sean M Conner
(74) *Attorney, Agent, or Firm* — Morgan, Lewis & Bockius LLP

(57) ABSTRACT

This application relates to a machine learning model training method and apparatus, and an expression image classification method and apparatus. The machine learning model training method includes: obtaining a machine learning model that includes a model parameter and that is obtained through training according to a general-purpose image training set; determining a sample of a special-purpose image and a corresponding classification label; inputting the sample of the special-purpose image to the machine learning model, to obtain an intermediate classification result; and adjusting the model parameter of the machine learning model according to a difference between the intermediate classification result and the classification label, continuing training, and ending the training in a case that a training stop (Continued)

condition is met. The solutions provided in this application improve the training efficiency of the machine learning model.

16 Claims, 6 Drawing Sheets

(56) References Cited

U.S. PATENT DOCUMENTS

2017/0124428 A1* 5/2017 Han .................. G06F 21/32
2018/0061058 A1* 3/2018 Xu ..................... G06N 3/084

FOREIGN PATENT DOCUMENTS

| CN | 104850890 A | 8/2015 |
|---|---|---|
| CN | 106127232 A | 11/2016 |
| CN | 106156807 A | 11/2016 |
| CN | 106228185 A | 12/2016 |
| CN | 106295566 A | 1/2017 |
| CN | 106897746 A | 6/2017 |

OTHER PUBLICATIONS

Xu, Zhao, et al. "Representative sampling for text classification using support vector machines." European conference on information retrieval. Springer, Berlin, Heidelberg, 2003. (Year: 2003).*

Tencent Technology, ISRWO, PCT/CN2018/090676, Aug. 31, 2018, 6 pgs.

Tencent Technology, IPRP, PCT/CN2018/090676, Jan. 14, 2020, 5 pgs.

Hong-Wei Ng et al., "Deep Learning for Emotion Recognition on Small Datasets Using Transfer Learning," Advanced Digital Sciences Center (ADSC), University of Illinois at Urbana-Champaign, Singapore, Nov. 2015, 7 pgs.

Jason Yosinski et al., "How Transferable are Features in Deep Neural Networks?", In Advances in Neural Information Processing Systems 27, NIPS Foundation, Nov. 6, 2014, 14 pgs.

* cited by examiner

MACHINE LEARNING MODEL TRAINING METHOD AND DEVICE, AND EXPRESSION IMAGE CLASSIFICATION METHOD AND DEVICE

CROSS-REFERENCE TO RELATED APPLICATIONS

This application is a continuation application of PCT/CN2018/090676, entitled "MACHINE LEARNING MODEL TRAINING METHOD AND APPARATUS, AND FACIAL EXPRESSION IMAGE CLASSIFICATION METHOD AND APPARATUS" filed on Jun. 11, 2018, which claims priority to Chinese Patent Application No. 201710566325.X, entitled "MACHINE LEARNING MODEL TRAINING METHOD AND APPARATUS, FACE IMAGE CLASSIFICATION METHOD AND APPARATUS" filed with the China National Intellectual Property Administration on Jul. 12, 2017, all of which are incorporated by reference in their entirety.

FIELD OF THE TECHNOLOGY

This application relates to the machine learning field, and in particular, to a machine learning model training method and apparatus, and an expression image classification method and apparatus.

BACKGROUND OF THE DISCLOSURE

Currently, with the development of terminal storage technologies and network technologies, interaction based on images becomes increasingly easy, and more users select to use images to perform interaction, causing an increasing quantity of images used for interaction. Classifying images appropriately plays a very important role in user personalized recommendation and user portrait building. Currently, a trained machine learning model may be used to classify images. A conventional machine learning model training manner is usually training a machine learning model by using a large amount of training data, and making the model learn a classification rule, to improve the classification accuracy of the model.

However, based on the conventional model training manner, because a large quantity of training data needs to be used, a lot of time is consumed for obtaining training data and using the training data to train the model, causing relatively low training efficiency of the machine learning model.

SUMMARY

Based on this, this application provides a machine learning model training method and apparatus, and an expression image classification method and apparatus, to resolve the problem of the low training efficiency of the conventional machine learning model.

A machine learning model training method is applied to a computer device, the method including:

obtaining a machine learning model through training according to a general-purpose image training set, wherein the machine learning model comprises one or more model parameters and that is obtained;

determining a sample set of special-purpose images and a corresponding classification label;

inputting the sample set of special-purpose images to the machine learning model, to obtain an intermediate classification result for the corresponding classification label;

adjusting the model parameters of the machine learning model according to a difference between the intermediate classification result and the classification label; and repeating the inputting and adjusting steps until that a training stop condition is met, to obtain the machine learning model with the adjusted model parameters.

A machine learning model training apparatus includes a computing device comprising one or more processors, memory coupled to the one or more processors and a plurality of programs stored in the memory that, when executed by the one or more processors, cause the computing device to perform the aforementioned machine learning model training method.

A non-transitory computer readable storage medium stores at least one instruction, at least one program, and a code set or an instruction set, and the at least one instruction, the at least one program, and the code set or the instruction set are loaded and executed by a processor to implement the foregoing machine learning model training method.

In the foregoing machine learning model training method and apparatus, a machine learning model that includes a model parameter and that is obtained through training according to a general-purpose image training set is obtained, and a sample of a special-purpose image and a corresponding classification label are used to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency.

In the foregoing expression image classification method and apparatus, an expression image is inputted to a trained machine learning model, a maximum probability in corresponding probabilities that the inputted expression image is classified to all classification labels is determined, and the expression image is classified to a classification label corresponding to the maximum probability, so that the machine learning model classifies the expression image, and selects the classification label corresponding to the maximum probability as a classification result, thereby improving the classification efficiency and accuracy of the expression image classification.

DESCRIPTION OF EMBODIMENTS

To make the technical solutions and advantages of this application clearer and more comprehensible, the following further describes this application in detail with reference to the accompanying drawings and embodiments. The specific embodiments described herein are merely used to describe this application, instead of limiting this application.

Figure 1:
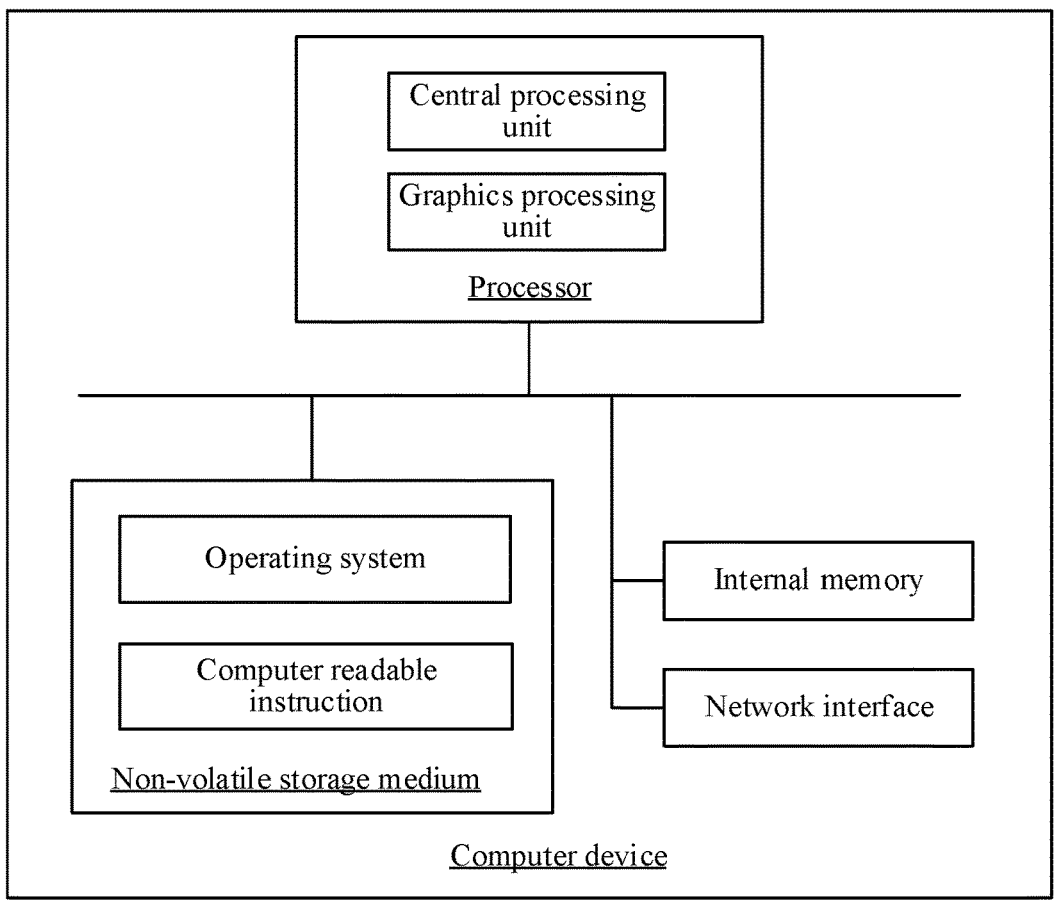
FIG. 1 is a diagram of an application environment of a machine learning model training method in an embodiment.

FIG. 1 is a diagram of an application environment of a machine learning model training method and/or an expression image classification method in an embodiment. As shown in FIG. 1, the machine learning model training method and/or expression image classification method is applied to a computer device. The computer device may be a terminal or a server. The terminal may be a desktop device or a mobile terminal, and the mobile terminal may be a touch screen mobile phone, a tablet computer, a wearable device, a personal reader, or the like. The server may be an independent physical server, a physical server cluster, or a virtual server (also referred to as a cloud server). The computer device includes a processor, a non-volatile storage medium, an internal memory, and a network interface that are connected to each other by using a system bus. The processor includes a central processing unit and a graphics processing unit. The non-volatile storage medium of the computer device stores an operating system, and may further store computer-readable instructions. When executed by the processor, the computer-readable instructions may cause the processor to implement the machine learning model training method and/or the expression image classification method. The central processing unit is configured to provide calculation and control capabilities, and support running of the entire computer device, and the graphics processing unit is configured to execute graphics processing instructions. The internal memory may also store computer-readable instructions. When executed by the processor, the computer-readable instructions may cause the processor to implement the machine learning model training method and/or the expression image classification method. A person skilled in the art may understand that, the structure shown in FIG. 1 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

Figure 2:
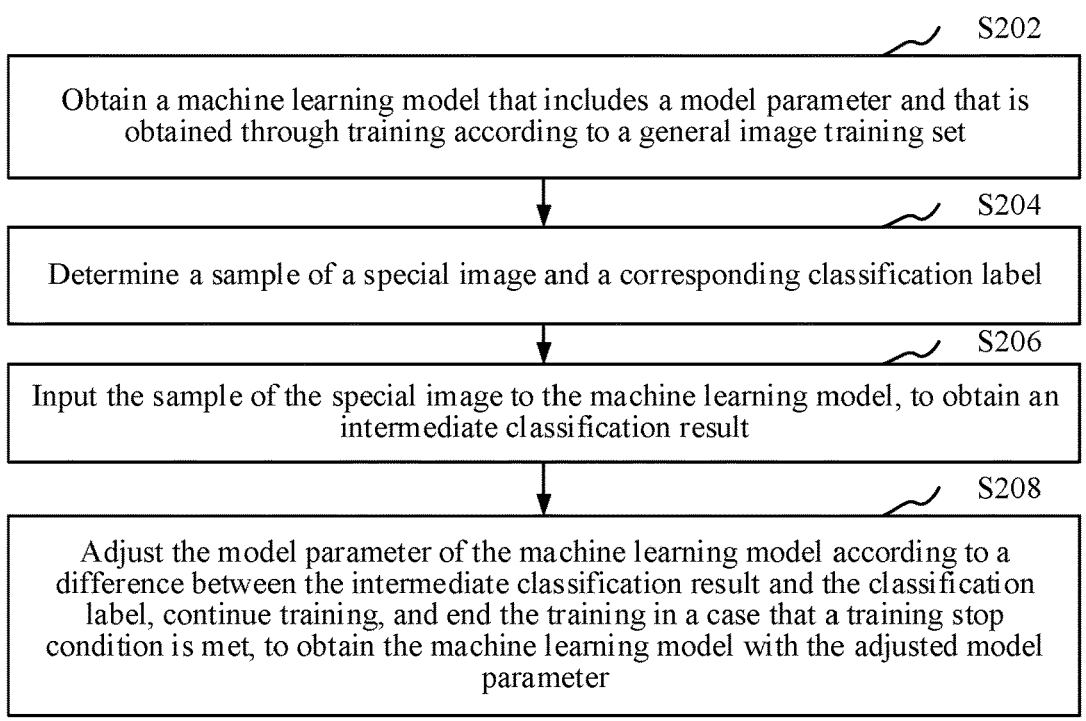
FIG. 2 is a schematic flowchart of a machine learning model training method in an embodiment.

FIG. 2 is a schematic flowchart of a machine learning model training method in an embodiment. This embodiment is described by using an example in which the method is applied to the computer device in FIG. 1. Referring to FIG. 2, the machine learning model training method may include the following steps:

Step S202. Obtain a machine learning model that includes a model parameter and that is obtained through training according to a general-purpose image training set.

The machine learning model is a machine learning algorithm model that has a classification capability after being trained. The machine learning is ML for short. The machine learning model may have a classification capability through sample learning. An image training set is a set of images for training a machine learning model. The model parameter is each parameter in a model structure of the machine learning model, and can reflect an output and input correspondence of the machine learning model.

The general-purpose image training set is an image training set for training a machine learning model having a general classification capability. The machine learning model obtained through training according to the general-purpose image training set may be referred to as a general machine learning model. The general machine learning model has a classification capability for a general image.

In an embodiment, the computer device may obtain a model structure and a model parameter of a trained machine learning model according to a general-purpose image training set, and import the model parameter into the model structure, to obtain a machine learning model carrying the model parameter. The model parameter carried by the machine learning model is used as an initial parameter for training the machine learning model in this embodiment to participate in the training.

In an embodiment, the general-purpose image training set may be a general-purpose image training set formed by images in an Image Net (image identification data library), and the corresponding machine learning model may be a VGG (Visual Geometry Group) network model, a GoogleNet network model, a ResNet (energy efficiency assessment system) network model, or the like.

Step S204. Determine a sample of a special-purpose image and a corresponding classification label.

The special-purpose image is an image having a special purpose, and is special relative to images in the general-purpose image training set. The machine learning model obtained through training according to the special-purpose image may be referred to as a special machine learning model. The special-purpose image may be classified into different categories. The categories that can be classified by the general machine learning model may be more than the categories that can be classified by the special machine learning model. The sample of the special-purpose image is a special-purpose image for training the special machine learning model. The classification label is data marking the category to which the sample of the special-purpose image belongs. In an embodiment, the special-purpose image may be an expression image, an application icon, an advertising image, a style art image, or the like. When the special-purpose image is an expression image, the classification label corresponding to the sample of the special-purpose image may include a holiday category, a love category, a lovely category, a real-person category, and a guilty pleasure category.

In an embodiment, the computer device may select a plurality of special-purpose images from a special-purpose image library as samples of the special-purpose images, classify the samples of the special-purpose images, and assign a classification label of each category of the samples of the special-purpose images.

In another embodiment, the computer device may first determine a classification label and a corresponding label definition, to select some special-purpose images meeting the definition of the classification label from the special-purpose image library according to the definition corresponding to the classification label, as the sample of the special-purpose image corresponding to the classification label.

Step S206. Input the sample of the special-purpose image to the machine learning model, to obtain an intermediate classification result.

The intermediate classification result is a classification result outputted by the machine learning model after the sample of the special-purpose image is inputted to the machine learning model in a training process.

In an embodiment, after the computer device inputs the sample of the special-purpose image to the machine learning model, the machine learning model may determine the classification label to which the sample of the special-purpose image belongs, to use the classification label as the intermediate classification result.

Step S208. Adjust the model parameter of the machine learning model according to a difference between the intermediate classification result and the classification label, continue training, and end the training in a case that a training stop condition is met, to obtain the machine learning model with the adjusted model parameter.

The training stop condition is a condition for ending model training. The training stop condition may be that a quantity of times of adjusting the model parameter of the machine learning model and continuing training reaches a preset quantity of iterations, or that a classification performance index of the machine learning model with the adjusted model parameter reaches a preset index. The adjusting the model parameter of the machine learning model is adjusting model parameters of the machine learning model.

Optionally, the computer device may compare the difference between the intermediate classification result and the classification label, to adjust the model parameter of the machine learning model at a learning rate less than a learning rate of training the machine learning model according to the general-purpose image training set, to reduce the difference. If after the model parameter is adjusted, the training stop condition is not met, go back to step S206 to continue training, and end the training in a case that the training stop condition is met. The learning rate is an important hyper-parameter in a machine learning model training process, and the learning rate may control a speed of adjusting a neural network weight based on a loss of gradient. Generally, a smaller learning rate indicates a slower speed of a decrease of a loss of gradient and more reliable training, but a longer consumed time.

In an embodiment, the adjusting the model parameter of the machine learning model may be partially adjusting model parameters of the machine learning model. For example, some model parameters may remain unchanged, and the other model parameters are adjusted.

In an embodiment, the difference between the intermediate classification result and the classification label may be measured by using a cost function. The cost function is a function of a model parameter, and a function that can measure the difference between the intermediate classification result of the machine learning model and the classification label. The computer device may end the training in a case that the value of the cost function is less than a preset value, to obtain a machine learning model for classifying the special-purpose image. The computer device may select a function such as a cross entropy or a mean square error as the cost function.

In the foregoing machine learning model training method, a machine learning model that includes a model parameter and that is obtained through training according to a general-purpose image training set is obtained, and a sample of a special-purpose image and a corresponding classification label are used to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency.

In an embodiment, step S204 includes: obtaining a representative special-purpose image corresponding to the classification label; determining, according to similarities between the representative special-purpose image and special-purpose images in a special-purpose image library, special-purpose images that are in the special-purpose image library and similar to the representative special-purpose image; and selecting a special-purpose image meeting a difference condition from the representative special-purpose image and the similar special-purpose images as the sample of the special-purpose image corresponding to the classification label.

The special-purpose image library is a set library of known special-purpose images, including all special-purpose images. The representative special-purpose image is a special-purpose image that is in special-purpose images of categories corresponding to the classification labels and that can represent this category of special-purpose images. Meeting the difference condition means that the special-purpose images in the special-purpose image set formed by the representative special-purpose image and the similar special-purpose images have differences restrained by using a mathematical condition.

In an embodiment, the computer device may select, from the special-purpose image library according to the meaning of the classification label, a special-purpose image that can represent the meaning of the classification label as the representative special-purpose image. In an embodiment, the representative special-purpose image corresponding to the classification label may be manually selected from the special-purpose image library.

In an embodiment, the computer device may obtain similarities between the representative special-purpose image and the special-purpose images in the special-purpose image library, to sort the special-purpose images in the special-purpose image library according to similarity values. Starting from a special-purpose image with a maximum similarity, a specified quantity of continuous similar special-purpose images is selected, and a special-purpose image meeting the difference condition is selected from the selected similar special-purpose images and the representative special-purpose image as the sample of the special-purpose image corresponding to the classification label.

In an embodiment, when selecting the special-purpose image meeting the difference condition from the representative special-purpose image and the similar special-purpose images, the computer device may compare the differences between any two special-purpose images in a set formed by the representative special-purpose image and the similar special-purpose images, to determine the special-purpose image meeting the difference condition. For example, if differences between a special-purpose image in the set and all other special-purpose images are relatively large, the special-purpose image may be determined as the special-purpose image meeting the difference condition.

The two special-purpose images with a relatively large difference may be two special-purpose images whose difference exceeds a preset value, or may be two special-purpose images corresponding to a preset quantity of differences sorted front in a descending sequence of differences between any two special-purpose images.

In an embodiment, when selecting the special-purpose image meeting the difference condition from the representative special-purpose image and the similar special-purpose images, the computer device may compare the similarities between any two special-purpose images in the set formed by the representative special-purpose image and the similar special-purpose images, and remove one of the two similar special-purpose images, to obtain the special-purpose image meeting the difference condition.

The two similar special-purpose images may be two special-purpose images whose similarity exceeds a preset value, or may be two special-purpose images corresponding to a preset quantity of similarities sorted front in a descending sequence of similarities between any two special-purpose images.

In the foregoing embodiment, special-purpose images that are similar to the representative special-purpose image corresponding to the classification label, and that have differences are selected as the samples of the special-purpose images to form training data together with the corresponding classification label, and each sample may try to provide useful information for training of the machine learning model, thereby improving the training efficiency of the machine learning model, and further reducing an over-fitting risk in the model training process.

In an embodiment, step S204 further includes: obtaining, after the representative special-purpose image is inputted to the machine learning model, an image feature outputted by an intermediate layer of the machine learning model; obtaining, after the special-purpose images in the special-purpose image library are inputted to the machine learning model, image features outputted by the intermediate layer of the machine learning model; and calculating the similarities between the representative special-purpose image and the special-purpose images in the special-purpose image library according to the image feature of the representative special-purpose image and the image features of the special-purpose images in the special-purpose image library.

The intermediate layer of the machine learning model is a layer between an input layer and an output layer of the machine learning model. The image feature of the special-purpose image is a feature representing that a corresponding special-purpose image is different from other images. The similarity may use a cosine similarity or a Hamming distance for sensing a Hash value between images.

In an embodiment, the machine learning model is a convolutional neural network model. The convolutional neural network (CNN for short) is an artificial neural network. The convolutional neural network includes a convolutional layer and a pooling layer.

A plurality of feature maps exists in the convolutional layer of the convolutional neural network, each feature map includes a plurality of neurons, and all neurons of the same feature map share a convolutional kernel. The convolutional kernel is a weight of a corresponding neuron, and the convolutional kernel represents one feature. The convolutional kernel is generally initialized in a form of a random decimal matrix, and a proper convolutional kernel is obtained through learning in a network training process. The convolutional layer may decrease connections between layers in a neural network, and also reduce an over-fitting risk.

The pooling usually has two forms: mean pooling and max pooling. The pooling may be seen as a special convolution process. The convolution and the pooling greatly simplify the complexity of the neural network and decrease parameters of the neural network.

The convolutional neural network model is a machine learning model trained by using a convolutional neural network algorithm. The convolutional neural network used in this embodiment may be directly built, or may be obtained by transforming a known convolutional neural network.

In an embodiment, the machine learning model is a convolutional neural network model. After inputting the representative special-purpose image to the convolutional neural network model, the computer device obtains data outputted by a convolutional layer or a full connection layer between an input layer and an output layer in the convolutional neural network model, as the image feature of the representative special-purpose image.

Figure 3:
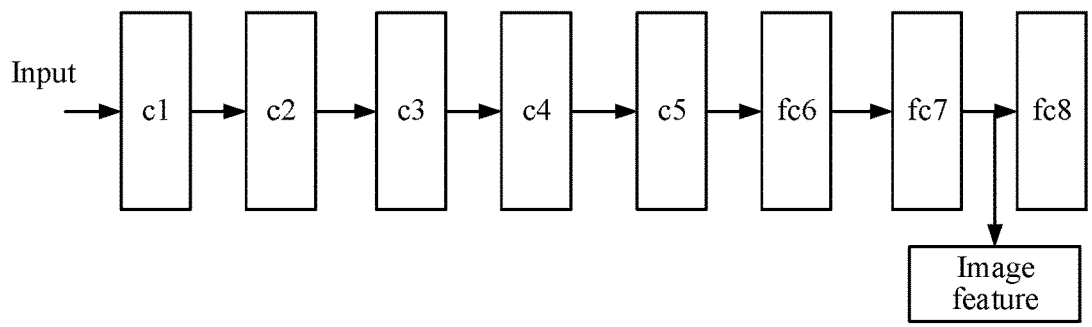
FIG. 3 is a schematic structural diagram of a VGG model in an embodiment.

In an embodiment, the machine learning model is a convolutional neural network model. After inputting the special-purpose images in the special-purpose image library to the machine learning model, the computer device obtains data outputted by a convolutional layer or a full connection layer between an input layer and an output layer in the convolutional neural network model, as the image features of the inputted special-purpose images For example, as shown in FIG. 3, the computer device may use an 8-layer VGG model as a machine learning model to be trained, where c1-c5 layers are convolutional layers, and fc6-fc8 layers are full connection layers. The computer device inputs the representative special-purpose image from the c1 layer, and extracts the image feature outputted by the fc7 full connection layer in the VGG model. Likewise, the computer device may input the special-purpose images in the special-purpose image library from the c1 layer, and extracts the image features outputted by the fc7 full connection layer in the VGG model. Then, the computer device may calculate the similarities between the representative special-purpose image and the special-purpose images in the special-purpose image library according to the image feature of the representative special-purpose image and the image features of the special-purpose images in the special-purpose image library.

In the foregoing embodiment, the image feature outputted by the intermediate layer of the machine learning model can well reflect characteristics of the corresponding special-purpose image, so that a desirable sample of the special-purpose image can be selected, thereby further improving the training efficiency of the machine learning model, and ensuring the classification accuracy of the trained machine learning model.

Figure 4:
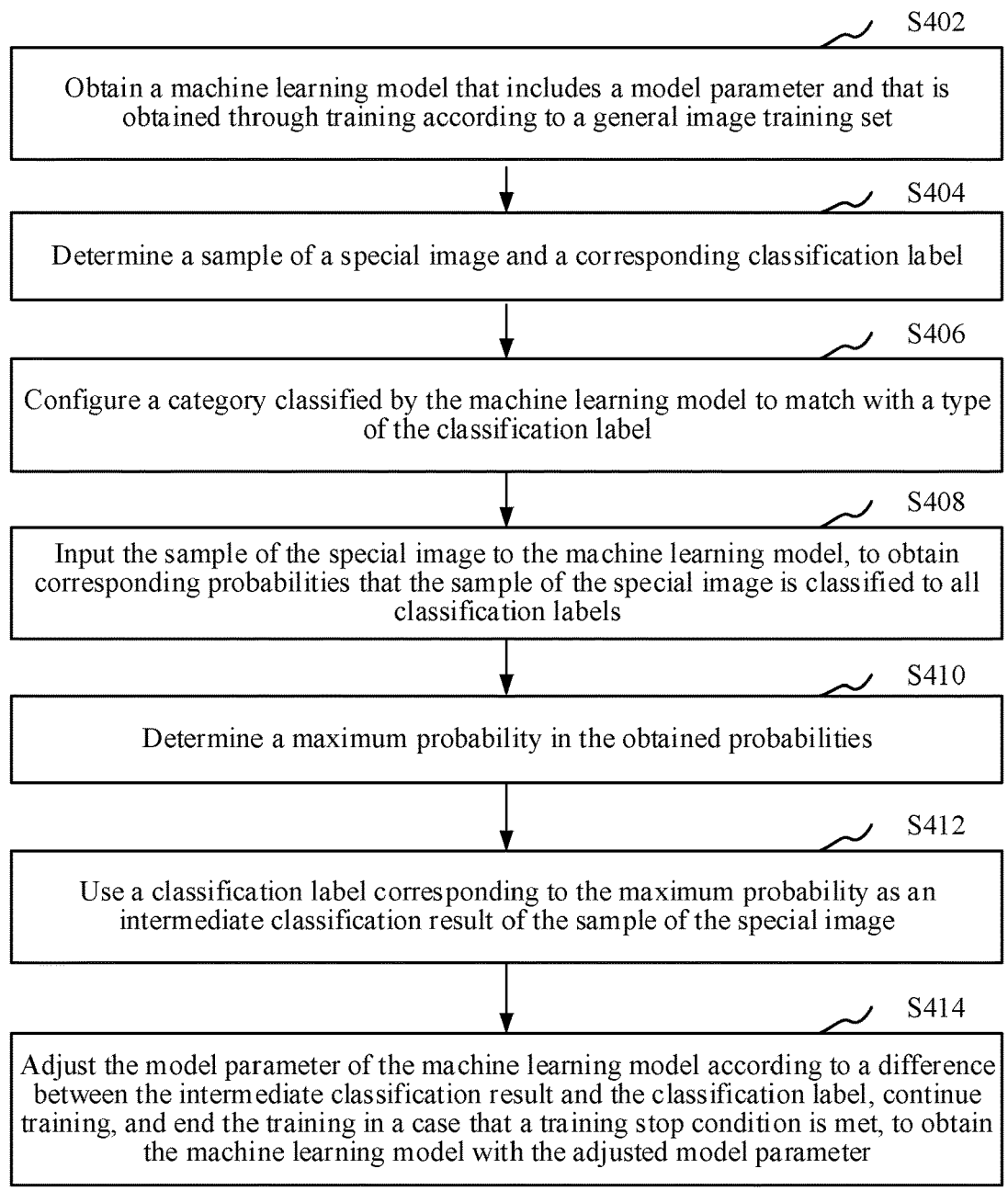
FIG. 4 is a schematic flowchart of a machine learning model training method in another embodiment.

As shown in FIG. 4, in an optional embodiment, the machine learning model training method includes the following steps:

Step S402. Obtain a machine learning model that includes a model parameter and that is obtained through training according to a general-purpose image training set.

For the implementation process of step S402, reference may be made to the description in the foregoing step S202, and details are not described herein again.

Step S404. Determine a sample of a special-purpose image and a corresponding classification label.

For the implementation process of step S404, reference may be made to the description in the foregoing step S204, and details are not described herein again.

Step S406. Configure a category classified by the machine learning model to match with a type of the classification label.

Optionally, the computer device may configure a quantity of classified categories in the model parameter of the machine learning model into a quantity of types of the classification labels, and match the classified categories in the model parameter of the machine learning model with the classification labels, so that a quantity of outputs of the machine learning models corresponds to the quantity of types of the classification labels.

Step S408. Input the sample of the special-purpose image to the machine learning model, to obtain corresponding probabilities that the sample of the special-purpose image is classified to all classification labels.

Optionally, the computer device may input the sample of the special-purpose image to the machine learning model, the machine learning model may obtain outputs in a corresponding quantity of the classification labels after processing the sample of the special-purpose image, and each output represents a corresponding probability that the sample of the special-purpose image belongs to a classification label.

For example, assuming that the quantity of types of the classification labels is N (N is an integer greater than 1), the machine learning model may obtain N outputs after processing the sample of the special-purpose image, where an $n^{th}$ (n is a positive integer not greater than N) output may represent a corresponding probability that the sample of the special-purpose image belongs to an $n^{th}$ classification label.

Step S410. Determine a maximum probability in the obtained probabilities.

In an embodiment, the computer device may compare one by one the corresponding probabilities that the sample of the special-purpose image is classified to all classification labels, to determine the maximum probability in the foregoing probabilities.

For example, the computer device may compare the N probabilities obtained in the foregoing step S408, and determine the maximum probability in the N probabilities.

Step S412. Use a classification label corresponding to the maximum probability as an intermediate classification result of the sample of the special-purpose image.

Optionally, after determining the maximum probability, the computer device may obtain the classification label corresponding to the maximum probability, to use the classification label as the intermediate classification result of the sample of the special-purpose image.

For example, assuming that the computer device determines that the maximum probability in the N probabilities is the second probability, a classification label corresponding to the second probability may be used as the intermediate classification result of the sample of the special-purpose image.

Step S414. Adjust the model parameter of the machine learning model according to a difference between the intermediate classification result and the classification label, continue training, and end the training in a case that a training stop condition is met, to obtain the machine learning model with the adjusted model parameter.

In an embodiment, the computer device may represent the classification label corresponding to the sample of the special-purpose image as a distribution vector of the classification label relative to a classification label set, and also represent the classification label (namely, the intermediate classification result) corresponding to the maximum probability as a distribution vector of the classification label relative to the classification label set, to calculate a vector similarity between the distribution vectors, and measure the difference between the intermediate classification result and the classification label by using the vector similarity.

A quantity of elements in the distribution vector is equal to a quantity of types of the classification labels, and each element corresponds to one type of the classification labels. When the classification label is represented as a distribution vector, elements that are in the distribution vector and that correspond to the classification label is set to a first value, and other elements in the distribution vector than the elements corresponding to the classification label are set to a second value. For example, the first value may be 1, and the second value may be 0.

In the foregoing embodiment, the categories classified by the machine learning model are configured to match with the types of the classification labels, so that the machine learning model can obtain outputs corresponding to the types of the classification labels, to obtain the probabilities that the sample of the special-purpose image belongs to all classification labels. An output corresponding to the maximum probability is selected as the intermediate classification result of the sample of the special-purpose image, and the difference between the intermediate classification result and the classification label corresponding to the sample of the special-purpose image is continuously reduced by adjusting the model parameter, so that the intermediate classification result is continuously close to the corresponding classification label, thereby improving the model classification accuracy.

In an embodiment, the machine learning model is a convolutional neural network model. Step S208 includes: remaining model parameters of layers sorted front according to a layer sequence in the machine learning model to be unchanged, adjusting model parameters of layers sorted behind according to the layer sequence in the machine learning model according to the difference between the intermediate classification result and the classification label, continuing training, and ending the training in a case that the training stop condition is met. The layers sorted front according to the layer sequence may be a specified quantity of front layers in the machine learning model, such as the front three layers. The layers sorted behind according to the layer sequence may be layers behind the specified quantity of front layers in the machine learning model, such as the layers behind the front three layers.

Optionally, in the machine learning model training process, because low-level features in the sample of the special-purpose image are extracted in the machine learning model according to the layers sorted front according to the layer sequence, and the differences between the low-level features of the general images in the general-purpose image training set and the special-purpose images in the special-purpose image library are small, so that the model parameters of the layers sorted front in the machine learning model trained by using the general-purpose image training set may remain unchanged in the training process. Meanwhile, the model parameters of the layers sorted behind according to the layer sequence in the machine learning model are adjusted in the model training process, and the training is ended in a case that the training stop condition is met.

For example, for the model training method whose machine learning model is a VGG model, model parameters of the front three convolutional layers in the VGG model may remain unchanged in the model training process. For example, values in convolutional kernels of the front three convolutional layers may remain unchanged, to adjust model parameters in rear layers at a learning rate smaller than a learning rate at which the machine learning model is trained according to the general-purpose image training set. For example, values in the convolutional kernels in the convolutional layer behind the front three layers and full connection layer matrix coefficients in the full connection layer may be adjusted according to the learning rate.

In the foregoing embodiment, in the machine learning model training process, remaining the model parameters of the layers sorted front according to the layer sequence in the machine learning model to be unchanged, and adjusting the model parameters of the layers sorted behind according to the layer sequence in the machine learning model can improve the model training efficiency.

Figure 5:
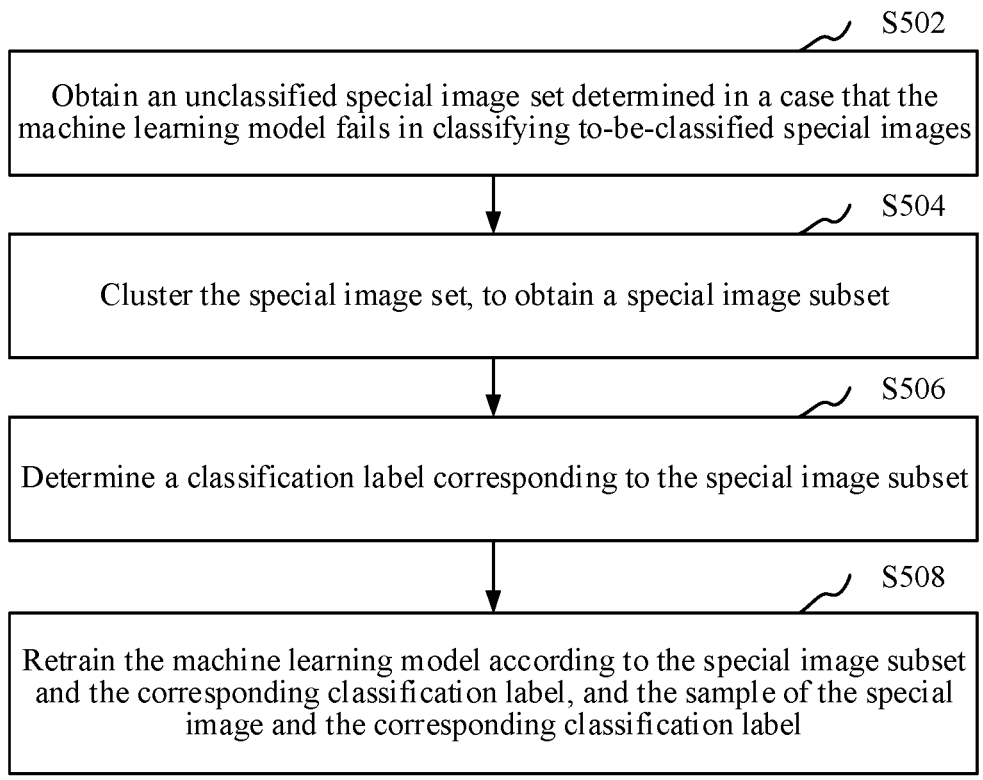
FIG. 5 is a schematic flowchart of a model retraining step in an embodiment.

In an embodiment, after step S208, the machine learning model training method further includes a model retraining step. As shown in FIG. 5, the model retraining step may include:

Step S502. Obtain an unclassified special-purpose image set determined in a case that the machine learning model fails in classifying to-be-classified special-purpose images.

The classification failure means that the special-purpose image cannot be classified to a corresponding classification label in a case that an output of the to-be-classified special-purpose image inputted to the machine learning model does not meet a condition that the special-purpose image belongs to the corresponding classification label.

Optionally, in a case that the machine learning model fails in classifying the to-be-classified special-purpose image, all unclassified special-purpose images may be combined, to construct the unclassified special-purpose image set.

Step S504. Cluster the special-purpose image set, to obtain a special-purpose image subset.

Clustering is dividing the special-purpose image set into one or more special-purpose image subsets formed by similar special-purpose images based on similarities of the special-purpose images. A clustering algorithm may be a partitioning method, a hierarchical method, a density-based method, a K-means algorithm, a spectral clustering algorithm, a graph theory clustering algorithm or another clustering analysis algorithm.

In an embodiment, the computer device clusters the special-purpose image set, and if the clustering is successful, similar special-purpose images form a special-purpose image subset. The special-purpose images in each special-purpose image subset are similar, and are different from other special-purpose image subsets.

In another embodiment, the computer device clusters the special-purpose image set, and if no similar special-purpose images are extracted, the clustering fails, and the special-purpose images that are not clustered successfully may still remain in the unclassified special-purpose image set.

Step S506. Determine a classification label corresponding to the special-purpose image subset.

Optionally, the computer device may generate the classification label corresponding to the special-purpose image subset according to a common feature of the special-purpose images in the special-purpose image subset. The classification label may well generalize the common feature of the special-purpose images in the special-purpose image subset.

Step S508. Retrain the machine learning model according to the special-purpose image subset and the corresponding classification label, and the sample of the special-purpose image and the corresponding classification label.

In an embodiment, the computer device may combine the special-purpose image subset and the corresponding classification label, and the sample of the special-purpose image and the corresponding classification label, to obtain a new sample of the special-purpose image and a corresponding classification label. The computer device uses the new sample of the special-purpose image and the corresponding classification label to perform the foregoing step S202 to step S208, to retrain the machine learning model.

In the foregoing embodiment, the machine learning model trained by using the sample of the special-purpose image and the corresponding classification label is retrained by using updated training data, thereby further improving the classification accuracy of the machine learning model.

Figure 6:
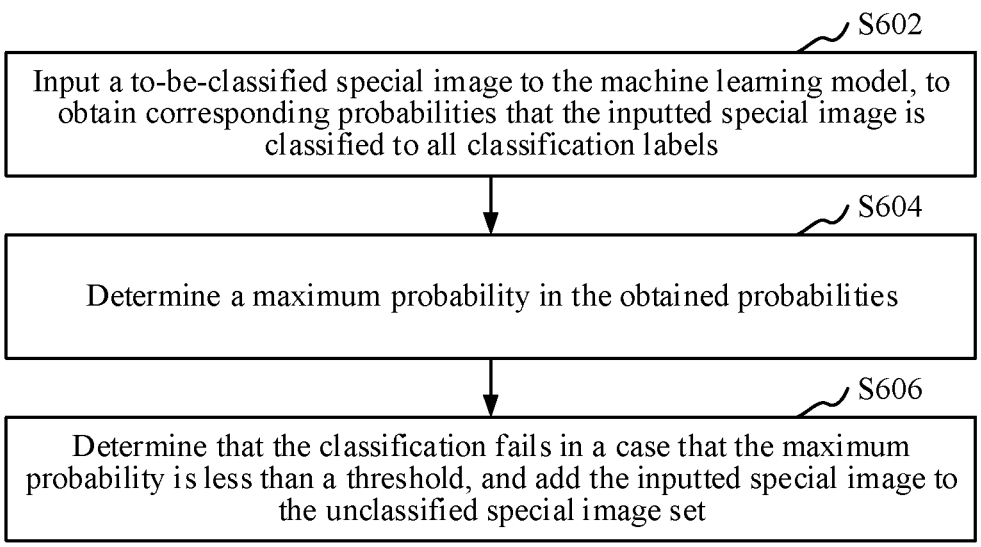
FIG. 6 is a schematic flowchart of a step of classifying a to-be-classified special-purpose image in an embodiment.

In an embodiment, after step S208, the machine learning model training method further includes a step of classifying a to-be-classified special-purpose image. As shown in FIG. 6, the step of classifying a to-be-classified special-purpose image may include:

Step S602. Input a to-be-classified special-purpose image to the machine learning model, to obtain corresponding probabilities that the inputted special-purpose image is classified to all classification labels.

Optionally, the computer device inputs the to-be-classified special-purpose image to the machine learning model, and the machine learning model may obtain outputs in a corresponding quantity of the classification labels after processing the to-be-classified special-purpose image. The corresponding outputs represent the probabilities that the special-purpose image belongs to the corresponding classification labels.

Step S604. Determine a maximum probability in the obtained probabilities.

In an embodiment, the computer device may compare one by one the corresponding probabilities that the to-be-classified special-purpose image is classified to all classification labels, to determine the maximum probability in the foregoing probabilities.

Step S606. Determine that the classification fails in a case that the maximum probability is less than a threshold, and add the inputted special-purpose image to the unclassified special-purpose image set.

In an embodiment, the computer device may determine whether the classification is successful by comparing the maximum probability in the obtained probabilities with a classification threshold. In a case that the maximum probability is greater than the classification threshold, if the inputted special-purpose image is classified to the classification label corresponding to the maximum probability, the classification is successful. In a case that the maximum probability is less than the classification threshold, the classification fails, and the inputted special-purpose image is added to the unclassified special-purpose image set.

In the foregoing embodiment, in a case that the maximum probability is less than the threshold, it is determined that the classification fails, so that the inputted special-purpose image is added to the unclassified special-purpose image set, to effectively separate special-purpose images that do not belong to known categories, which helps find a new classification label efficiently, thereby further improving the classification capability of the machine learning model.

In an embodiment, step S504 includes: inputting the special-purpose images in the special-purpose image set to the machine learning model obtained after the training is ended, to obtain image features of the corresponding special-purpose images outputted by the intermediate layer of the machine learning model; and performing clustering according to the image features of the special-purpose images in the special-purpose image set, to obtain the special-purpose image subset.

Optionally, the computer device may extract, after the special-purpose images in the special-purpose image set are inputted to the machine learning model obtained after the training is ended, image features outputted by the intermediate layer of the machine learning model. Clustering is performed according to the image features, and whether special-purpose images in the same clustering center conform to the definition of the same classification label is determined. If yes, whether the sum of Euclidean distances from the image features of the special-purpose images in the same clustering center to the clustering center is less than a preset value is determined. If yes, the clustering is successful; otherwise, the clustering fails. The special-purpose images that are in the same clustering center and that are clustered successfully construct the special-purpose image subset.

In an embodiment, a quantity of clustering centers set when the computer device performs clustering according to the image features may be 2 to 5. Optionally, the computer device may further implement visualization of a clustering process and a clustering result.

In the foregoing embodiment, after the training is ended, by using the obtained image features outputted by the intermediate layer of the machine learning model, characteristics of the corresponding special-purpose image can be well obtained, and during clustering, special-purpose images in the same category can be efficiently and accurately clustered to the same special-purpose image subset.

In an embodiment, the special-purpose image is an expression image, and the classification label is an expression classification label. The expression image is an image simulating a human expression, such as a cartoon character, a cartoon animal, or a real-person image, and may be used in a terminal to help people's daily communication and interaction. Optionally, the special-purpose image may be an expression image, for example, an expression image simulating a real-person expression and an expression image of a cartoon animal that are widely applied to an instant messaging application now. Correspondingly, the classification label may be an expression classification label corresponding to the expression image.

Figure 7:
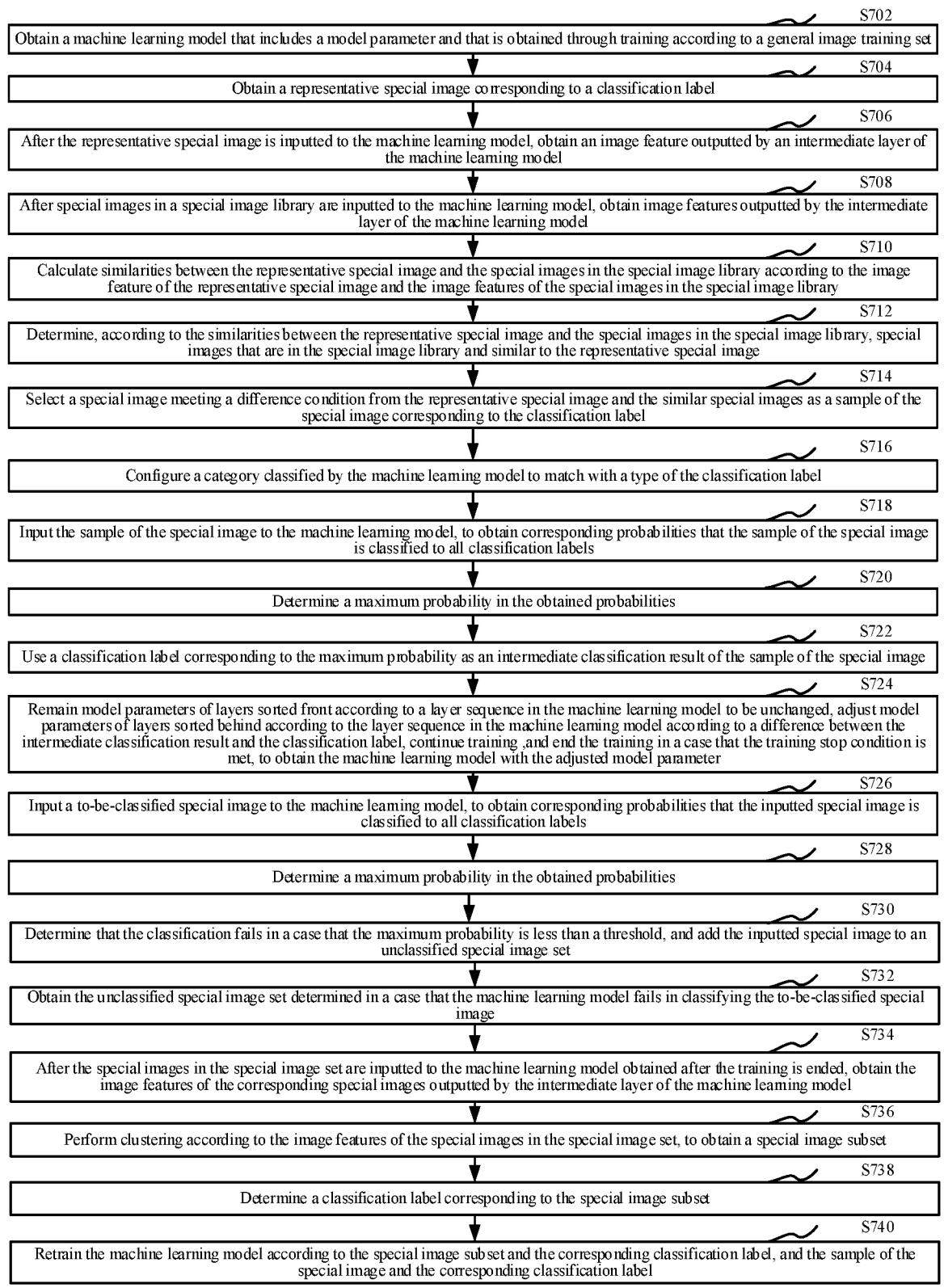
FIG. 7 is a schematic flowchart of a machine learning model training method in an embodiment.

As shown in FIG. 7, in an optional embodiment, the machine learning model training method includes the following steps:

Step S702. Obtain a machine learning model that includes a model parameter and that is obtained through training according to a general-purpose image training set.

Step S704. Obtain a representative special-purpose image corresponding to a classification label.

Step S706. After the representative special-purpose image is inputted to the machine learning model, obtain an image feature outputted by an intermediate layer of the machine learning model.

Step S708. After special-purpose images in a special-purpose image library are inputted to the machine learning model, obtain image features outputted by the intermediate layer of the machine learning model.

Step S710. Calculate similarities between the representative special-purpose image and the special-purpose images in the special-purpose image library according to the image feature of the representative special-purpose image and the image features of the special-purpose images in the special-purpose image library.

Step S712. Determine, according to the similarities between the representative special-purpose image and the special-purpose images in the special-purpose image library, special-purpose images that are in the special-purpose image library and similar to the representative special-purpose image.

Step S714. Select a special-purpose image meeting a difference condition from the representative special-purpose image and the similar special-purpose images as a sample of the special-purpose image corresponding to the classification label.

Step S716. Configure a category classified by the machine learning model to match with a type of the classification label.

Step S718. Input the sample of the special-purpose image to the machine learning model, to obtain corresponding probabilities that the sample of the special-purpose image is classified to all classification labels.

Step S720. Determine a maximum probability in the obtained probabilities.

Step S722. Use a classification label corresponding to the maximum probability as an intermediate classification result of the sample of the special-purpose image.

Step S724. Remain model parameters of layers sorted front according to a layer sequence in the machine learning model to be unchanged, adjust model parameters of layers sorted behind according to the layer sequence in the machine learning model according to a difference between the intermediate classification result and the classification label, continue training, and end the training in a case that the training stop condition is met, to obtain the machine learning model with the adjusted model parameter.

Step S726. Input a to-be-classified special-purpose image to the machine learning model, to obtain corresponding probabilities that the inputted special-purpose image is classified to all classification labels.

Step S728. Determine a maximum probability in the obtained probabilities.

Step S730. Determine that the classification fails in a case that the maximum probability is less than a threshold, and add the inputted special-purpose image to an unclassified special-purpose image set.

Step S732. Obtain the unclassified special-purpose image set determined in a case that the machine learning model fails in classifying the to-be-classified special-purpose image.

Step S734. After the special-purpose images in the special-purpose image set are inputted to the machine learning model obtained after the training is ended, obtain the image features of the corresponding special-purpose images outputted by the intermediate layer of the machine learning model.

Step S736. Perform clustering according to the image features of the special-purpose images in the special-purpose image set, to obtain a special-purpose image subset.

Step S738. Determine a classification label corresponding to the special-purpose image subset.

Step S740. Retrain the machine learning model according to the special-purpose image subset and the corresponding classification label, and the sample of the special-purpose image and the corresponding classification label.

For the implementation processes of the foregoing step S702 to step S740, reference may be made to the descriptions of the corresponding steps in the foregoing method embodiments, and details are not described herein again.

In the foregoing machine learning model training method, a machine learning model that includes a model parameter and that is obtained through training according to a general-purpose image training set is obtained, and a sample of a special-purpose image and a corresponding classification label are used to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency. Moreover, performing training based on the machine learning model that includes the model parameter and that is obtained through training according to the general-purpose image training set can greatly reduce an over-fitting risk generated when a small amount of training data is used to train the model.

Figure 8:
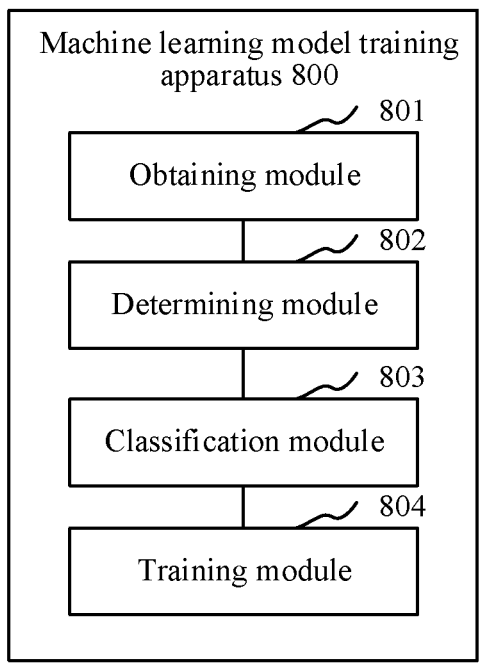
FIG. 8 is a structural block diagram of a machine learning model training apparatus in an embodiment.

As shown in FIG. 8, in an embodiment, a machine learning model training apparatus 800 is provided, including: an obtaining module 801, a determining module 802, a classification module 803 and a training module 804.

The obtaining module 801 is configured to obtain a machine learning model that includes a model parameter and that is obtained through training according to a general-purpose image training set.

The determining module 802 is configured to determine a sample of a special-purpose image and a corresponding classification label.

The classification module 803 is configured to input the sample of the special-purpose image to the machine learning model, to obtain an intermediate classification result.

The training module 804 is configured to adjust the model parameter of the machine learning model according to a difference between the intermediate classification result and the classification label, continue training, and end the training in a case that a training stop condition is met, to obtain the machine learning model with the adjusted model parameter.

In the foregoing machine learning model training apparatus 800, a machine learning model that includes a model parameter and that is obtained through training according to a general-purpose image training set is obtained, and a sample of a special-purpose image and a corresponding classification label are used to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency.

In an embodiment, the determining module 802 is further configured to obtain a representative special-purpose image corresponding to the classification label; determine, according to similarities between the representative special-purpose image and special-purpose images in a special-purpose image library, special-purpose images that are in the special-purpose image library and similar to the representative special-purpose image; and select a special-purpose image meeting a difference condition from the representative special-purpose image and the similar special-purpose images as the sample of the special-purpose image corresponding to the classification label.

In the foregoing embodiment, special-purpose images that are similar to the representative special-purpose image corresponding to the classification label, and that have differences are selected as the samples of the special-purpose images to form training data together with the corresponding classification label, and each sample may try to provide useful information for training of the machine learning model, thereby improving the training efficiency of the machine learning model, and further reducing an over-fitting risk in the model training process.

In an embodiment, the determining module 802 is further configured to obtain, after the representative special-purpose image is inputted to the machine learning model, an image feature outputted by an intermediate layer of the machine learning model; obtain, after the special-purpose images in the special-purpose image library are inputted to the machine learning model, image features outputted by the intermediate layer of the machine learning model; and calculate the similarities between the representative special-purpose image and the special-purpose images in the special-purpose image library according to the image feature of the representative special-purpose image and the image features of the special-purpose images in the special-purpose image library.

In the foregoing embodiment, the image feature outputted by the intermediate layer of the machine learning model can well reflect characteristics of the corresponding special-purpose image, so that a desirable sample of the special-purpose image can be selected, thereby further improving the training efficiency of the machine learning model, and ensuring the classification accuracy of the trained machine learning model.

Figure 9:
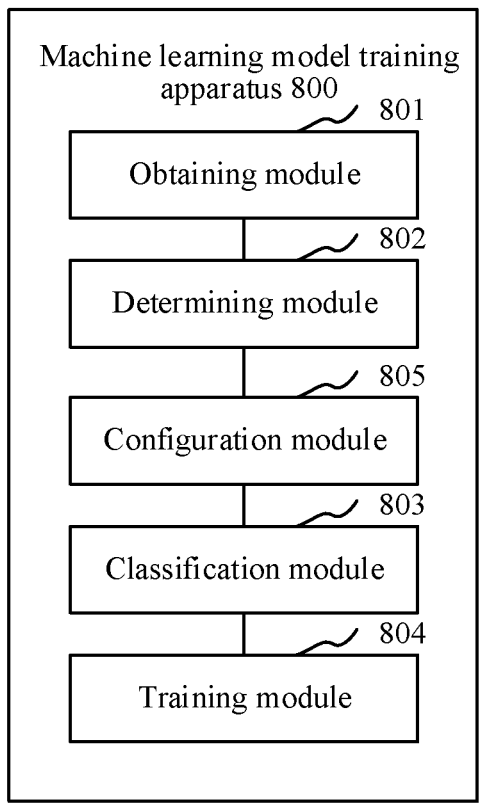
FIG. 9 is a structural block diagram of a machine learning model training apparatus in another embodiment.

As shown in FIG. 9, in an embodiment, the machine learning model training apparatus 800 further includes: a configuration module 805.

The configuration module 805 is configured to configure a category classified by the machine learning model to match with a type of the classification label.

The classification module 803 is further configured to: input the sample of the special-purpose image to the machine learning model, to obtain corresponding probabilities that the sample of the special-purpose image is classified to all classification labels; determine a maximum probability in the obtained probabilities; and use a classification label corresponding to the maximum probability as the intermediate classification result of the sample of the special-purpose image.

In the foregoing embodiment, the categories classified by the machine learning model are configured to match with the types of the classification labels, so that the machine learning model can obtain outputs corresponding to the types of the classification labels, to obtain the probabilities that the sample of the special-purpose image belongs to all classification labels. An output corresponding to the maximum probability is selected as the intermediate classification result of the sample of the special-purpose image, and the difference between the intermediate classification result and the classification label corresponding to the sample of the special-purpose image is continuously reduced by adjusting the model parameter, so that the intermediate classification result is continuously close to the corresponding classification label, thereby improving the model classification accuracy.

In an embodiment, the machine learning model is a convolutional neural network model. The training module 804 is configured to: remain model parameters of layers sorted front according to a layer sequence in the machine learning model to be unchanged, adjust model parameters of layers sorted behind according to the layer sequence in the machine learning model according to the difference between the intermediate classification result and the classification label, continue training, and end the training in a case that the training stop condition is met. The layers sorted front according to the layer sequence may be a specified quantity of front layers in the machine learning model, and the layers sorted behind according to the layer sequence may be layers behind the specified quantity of front layers in the machine learning model.

In the foregoing embodiment, in the machine learning model training process, remaining the model parameters of the layers sorted front according to the layer sequence in the machine learning model to be unchanged, and adjusting the model parameters of the layers sorted behind according to the layer sequence in the machine learning model can improve the model training efficiency.

In an embodiment, the training module 804 is further configured to obtain an unclassified special-purpose image set determined in a case that the machine learning model fails in classifying to-be-classified special-purpose images; cluster the special-purpose image set, to obtain a special-purpose image subset; determine a classification label corresponding to the special-purpose image subset; and retrain the machine learning model according to the special-purpose image subset and the corresponding classification label, and the sample of the special-purpose image and the corresponding classification label.

In the foregoing embodiment, the machine learning model trained by using the sample of the special-purpose image and the corresponding classification label is retrained by using updated training data, thereby further improving the classification accuracy of the machine learning model.

In an embodiment, the training module 804 is further configured to input a to-be-classified special-purpose image to the machine learning model, to obtain corresponding probabilities that the inputted special-purpose image is classified to all classification labels; determine a maximum probability in the obtained probabilities; and determine that the classification fails in a case that the maximum probability is less than a threshold, and add the inputted special-purpose image to the unclassified special-purpose image set.

In the foregoing embodiment, in a case that the maximum probability is less than the threshold, it is determined that the classification fails, so that the inputted special-purpose image is added to the unclassified special-purpose image set, to effectively separate special-purpose images that do not belong to known categories, which helps find a new classification label efficiently, thereby further improving the classification capability of the machine learning model.

In an embodiment, the training module 804 is further configured to input the special-purpose images in the special-purpose image set to the machine learning model obtained after the training is ended, to obtain image features of the corresponding special-purpose images outputted by the intermediate layer of the machine learning model; and perform clustering according to the image features of the special-purpose images in the special-purpose image set, to obtain the special-purpose image subset.

In the foregoing embodiment, after the training is ended, by using the obtained image features outputted by the intermediate layer of the machine learning model, characteristics of the corresponding special-purpose image can be well obtained, and during clustering, special-purpose images in the same category can be efficiently and accurately clustered to the same special-purpose image subset.

It may be clearly understood by a person skilled in the art that for convenience and brevity of description, for a working process of the foregoing apparatus and module, reference may be made to a corresponding process in the foregoing method embodiments, and details are not described herein again.

Figure 10:
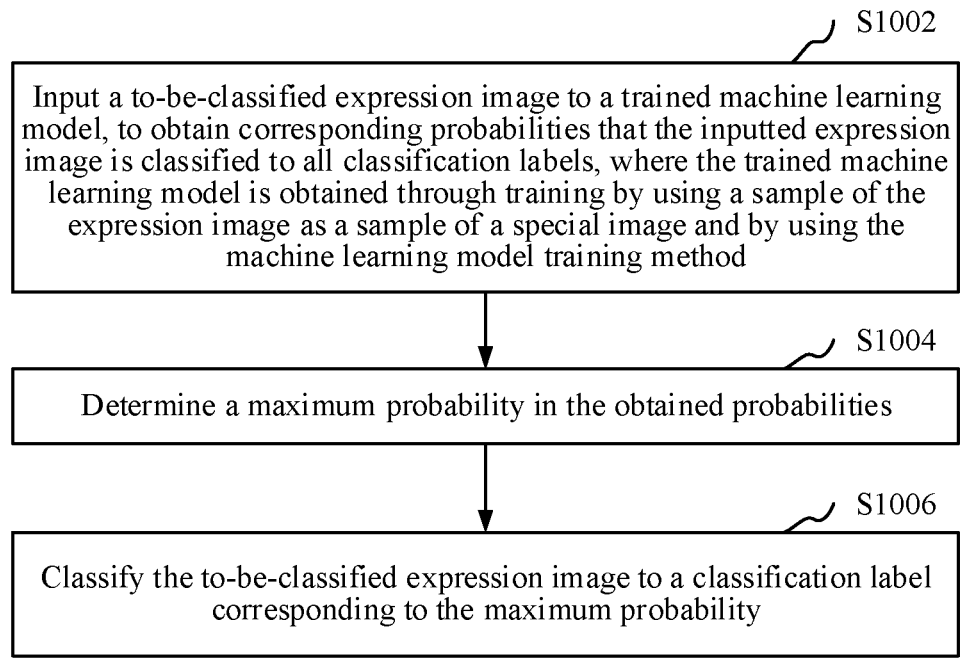
FIG. 10 is a schematic flowchart of an expression image classification method in an embodiment.

FIG. 10 is a schematic flowchart of an expression image classification method in an embodiment. This embodiment is described by using an example in which the method is applied to the computer device in FIG. 1. Referring to FIG. 10, the expression image classification method may include the following steps:

Step S1002. Input a to-be-classified expression image to a trained machine learning model, to obtain corresponding probabilities that the inputted expression image is classified to all classification labels, where the trained machine learning model is obtained through training by using a sample of the expression image as a sample of a special-purpose image and by using the machine learning model training method.

Optionally, the computer device inputs the to-be-classified expression image to the trained machine learning model, and the trained machine learning model may obtain outputs in a corresponding quantity of classification labels after processing the to-be-classified expression image. The corresponding outputs represent the probabilities that the expression image belongs to the corresponding classification labels. The trained machine learning model is obtained through training by using the sample of the expression image as the sample of the special-purpose image and by using the machine learning model training method.

Step S1004. Determine a maximum probability in the obtained probabilities.

In an embodiment, the computer device may compare one by one the corresponding probabilities that the to-be-classified expression image is classified to all classification labels, to determine the maximum probability in the foregoing probabilities.

Step S1006. Classify the to-be-classified expression image to a classification label corresponding to the maximum probability.

In an embodiment, the computer device classifies the inputted expression image to the classification label corresponding to the maximum probability.

In the foregoing expression image classification method, an expression image is inputted to a trained machine learning model, a maximum probability in corresponding probabilities that the inputted expression image is classified to all classification labels is determined, and the expression image is classified to a classification label corresponding to the maximum probability, so that the machine learning model classifies the expression image, and selects the classification label corresponding to the maximum probability as a classification result, thereby improving the classification efficiency and accuracy of the expression image classification.

In addition, after the expression image classification method provided in this application is used to classify expression images in an instant messaging application, a user portrait can be built according to classification labels to which expression images sent by the user in the past belongs, so as to perform operations such as personalized recommendation or advertising for the user. The user portrait may be a labeled user model abstracted according to information such as a social attribute, a living habit, and a consuming behavior of the user.

Figure 11:
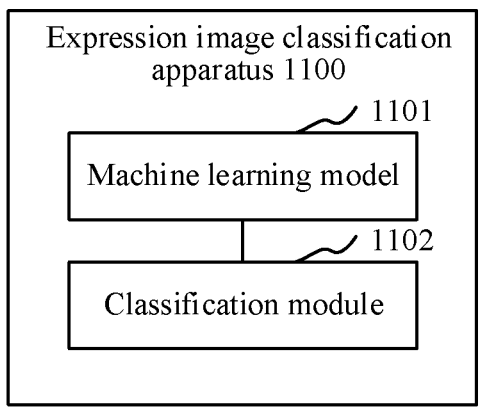
FIG. 11 is a structural block diagram of an expression image classification apparatus in an embodiment.

As shown in FIG. 11, in an embodiment, an expression image classification apparatus 1100 is provided, including: a machine learning model 1101 and a classification module 1102.

The machine learning model 1101 is configured to input a to-be-classified expression image, and output corresponding probabilities that the to-be-classified expression image is classified to all classification labels, where the machine learning model is obtained through training by using a sample of the expression image as a sample of a special-purpose image and by using the machine learning model training apparatus.

The classification module 1102 is configured to determine a maximum probability in the obtained probabilities; and classify the to-be-classified expression image to a classification label corresponding to the maximum probability.

In the foregoing expression image classification apparatus, an expression image is inputted to a trained machine learning model, a maximum probability in corresponding probabilities that the inputted expression image is classified to all classification labels is determined, and the expression image is classified to a classification label corresponding to the maximum probability, so that the machine learning model classifies the expression image, and selects the classification label corresponding to the maximum probability as a classification result, thereby improving the classification efficiency and accuracy of the expression image classification.

In an embodiment, the machine learning model training apparatus provided in this application may be implemented as a form of a computer program. The computer program may run on the computer device shown in FIG. 1, and the non-volatile storage medium of the computer device may store program modules forming the machine learning model training apparatus, such as the obtaining module 801 shown in FIG. 8. The program modules include computer readable instructions, and the computer readable instructions are used to cause the computer device to perform the steps in the application processing method of the embodiments of this application described in this specification. For example, through the machine learning model training apparatus 800 shown in FIG. 8, the computer device may obtain, by using the obtaining module 801, a machine learning model that includes a model parameter and that is obtained training according to a general-purpose image training set, input, by using the classification module 803, a sample of a special-purpose image determined by the determining module 802, to obtain an intermediate classification result, and then adjust the model parameter of the machine learning model according to a model training result by using the training module 804, to improve the classification accuracy of the machine learning model.

In an embodiment, a computer device is provided, including a memory and a processor. The memory stores computer readable instructions, and when executed by the processor, the computer readable instructions cause the processor to perform the following steps: obtaining a machine learning model that includes a model parameter and that is obtained through training according to a general-purpose image training set; determining a sample of a special-purpose image and a corresponding classification label; inputting the sample of the special-purpose image to the machine learning model, to obtain an intermediate classification result; and adjusting the model parameter of the machine learning model according to a difference between the intermediate classification result and the classification label, continuing training, and ending the training in a case that a training stop condition is met, to obtain the machine learning model with the adjusted model parameter.

In an embodiment, the computer readable instructions may cause the processor to perform the following steps when performing the determining a sample of a special-purpose image and a corresponding classification label: obtaining a representative special-purpose image corresponding to the classification label; determining, according to similarities between the representative special-purpose image and special-purpose images in a special-purpose image library, special-purpose images that are in the special-purpose image library and similar to the representative special-purpose image; and selecting a special-purpose image meeting a difference condition from the representative special-purpose image and the similar special-purpose images as the sample of the special-purpose image corresponding to the classification label.

In an embodiment, the computer readable instructions cause the processor to further perform the following steps after performing the step of obtaining a representative special-purpose image corresponding to the classification label: obtaining, after the representative special-purpose image is inputted to the machine learning model, an image feature outputted by an intermediate layer of the machine learning model; obtaining, after the special-purpose images in the special-purpose image library are inputted to the machine learning model, image features outputted by the intermediate layer of the machine learning model; and calculating the similarities between the representative special-purpose image and the special-purpose images in the special-purpose image library according to the image feature of the representative special-purpose image and the image features of the special-purpose images in the special-purpose image library.

In an embodiment, the computer readable instructions cause the processor to further perform the following steps before performing the step of inputting the sample of the special-purpose image to the machine learning model, to obtain an intermediate classification result: configuring a category classified by the machine learning model to match with a type of the classification label; and when performing the inputting the sample of the special-purpose image to the machine learning model, to obtain an intermediate classification result, the processor may perform the following steps: inputting the sample of the special-purpose image to the machine learning model, to obtain corresponding probabilities that the sample of the special-purpose image is classified to all classification labels; determining a maximum probability in the obtained probabilities; and using a classification label corresponding to the maximum probability as the intermediate classification result of the sample of the special-purpose image.

In an embodiment, the computer readable instructions may cause the processor to perform the following steps when performing the adjusting the model parameter of the machine learning model according to a difference between the intermediate classification result and the classification label, continuing training, and ending the training in a case that a training stop condition is met: remaining model parameters of layers sorted front according to a layer sequence in the machine learning model to be unchanged, adjusting model parameters of layers sorted behind according to the layer sequence in the machine learning model according to the difference between the intermediate classification result and the classification label, continuing training, and ending the training in a case that the training stop condition is met.

In an embodiment, the computer readable instructions cause the processor to perform the following steps: obtaining an unclassified special-purpose image set determined in a case that the machine learning model fails in classifying to-be-classified special-purpose images; clustering the special-purpose image set, to obtain a special-purpose image subset; determining a classification label corresponding to the special-purpose image subset; and retraining the machine learning model according to the special-purpose image subset and the corresponding classification label, and the sample of the special-purpose image and the corresponding classification label.

In an embodiment, the computer readable instructions cause the processor to perform the following steps: inputting a to-be-classified special-purpose image to the machine learning model, to obtain corresponding probabilities that the inputted special-purpose image is classified to all classification labels; determining a maximum probability in the obtained probabilities; and determining that the classification fails in a case that the maximum probability is less than a threshold, and adding the inputted special-purpose image to the unclassified special-purpose image set.

In an embodiment, the computer readable instructions may cause the processor to perform the following steps when clustering the special-purpose image set, to obtain a special-purpose image subset: inputting the special-purpose images in the special-purpose image set to the machine learning model obtained after the training is ended, to obtain image features of the corresponding special-purpose images outputted by the intermediate layer of the machine learning model; and performing clustering according to the image features of the special-purpose images in the special-purpose image set, to obtain the special-purpose image subset.

The foregoing computer device obtains a machine learning model that includes a model parameter and that is obtained through training according to a general-purpose image training set, and uses a sample of a special-purpose image and a corresponding classification label to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency.

In an embodiment, a computer device is provided, including a memory and a processor. The memory stores computer readable instructions, and when executed by the processor, the computer readable instructions cause the processor to perform the following steps: inputting a to-be-classified expression image to a trained machine learning model, to obtain corresponding probabilities that the inputted expression image is classified to all classification labels, where the trained machine learning model is obtained through training by using a sample of the expression image as a sample of a special-purpose image and by using the machine learning model training method; determining a maximum probability in the obtained probabilities; and classifying the to-be-classified expression image to a classification label corresponding to the maximum probability.

The foregoing computer device inputs an expression image to a trained machine learning model, determines a maximum probability in corresponding probabilities that the inputted expression image is classified to all classification labels, and classifies the expression image to a classification label corresponding to the maximum probability, so that the machine learning model classifies the expression image, and selects the classification label corresponding to the maximum probability as a classification result, thereby improving the classification efficiency and accuracy of the expression image classification.

A computer readable storage medium stores computer readable instructions. When executed by a processor, the computer readable instructions implement the following steps: obtaining a machine learning model that includes a model parameter and that is obtained through training according to a general-purpose image training set; determining a sample of a special-purpose image and a corresponding classification label; inputting the sample of the special-purpose image to the machine learning model, to obtain an intermediate classification result; and adjusting the model parameter of the machine learning model according to a difference between the intermediate classification result and the classification label, continuing training, and ending the training in a case that a training stop condition is met, to obtain the machine learning model with the adjusted model parameter.

In an embodiment, the computer readable instructions may cause the processor to perform the following steps when performing the determining a sample of a special-purpose image and a corresponding classification label: obtaining a representative special-purpose image corresponding to the classification label; determining, according to similarities between the representative special-purpose image and special-purpose images in a special-purpose image library, special-purpose images that are in the special-purpose image library and similar to the representative special-purpose image; and selecting a special-purpose image meeting a difference condition from the representative special-purpose image and the similar special-purpose images as the sample of the special-purpose image corresponding to the classification label.

In an embodiment, the computer readable instructions cause the processor to further perform the following steps after performing the step of obtaining a representative special-purpose image corresponding to the classification label: obtaining, after the representative special-purpose image is inputted to the machine learning model, an image feature outputted by an intermediate layer of the machine learning model; obtaining, after the special-purpose images in the special-purpose image library are inputted to the machine learning model, image features outputted by the intermediate layer of the machine learning model; and calculating the similarities between the representative special-purpose image and the special-purpose images in the special-purpose image library according to the image feature of the representative special-purpose image and the image features of the special-purpose images in the special-purpose image library.

In an embodiment, the computer readable instructions cause the processor to further perform the following steps before performing the step of inputting the sample of the special-purpose image to the machine learning model, to obtain an intermediate classification result: configuring a category classified by the machine learning model to match with a type of the classification label; and when performing the inputting the sample of the special-purpose image to the machine learning model, to obtain an intermediate classification result, the processor may perform the following steps: inputting the sample of the special-purpose image to the machine learning model, to obtain corresponding probabilities that the sample of the special-purpose image is classified to all classification labels; determining a maximum probability in the obtained probabilities; and using a classification label corresponding to the maximum probability as the intermediate classification result of the sample of the special-purpose image.

In an embodiment, the computer readable instructions may cause the processor to perform the following steps when performing the adjusting the model parameter of the machine learning model according to a difference between the intermediate classification result and the classification label, continuing training, and ending the training in a case that a training stop condition is met: remaining model parameters of layers sorted front according to a layer sequence in the machine learning model to be unchanged, adjusting model parameters of layers sorted behind according to the layer sequence in the machine learning model according to the difference between the intermediate classification result and the classification label, continuing training, and ending the training in a case that the training stop condition is met.

In an embodiment, the computer readable instructions cause the processor to perform the following steps: obtaining an unclassified special-purpose image set determined in a case that the machine learning model fails in classifying to-be-classified special-purpose images; clustering the special-purpose image set, to obtain a special-purpose image subset; determining a classification label corresponding to the special-purpose image subset; and retraining the machine learning model according to the special-purpose image subset and the corresponding classification label, and the sample of the special-purpose image and the corresponding classification label.

In an embodiment, the computer readable instructions cause the processor to perform the following steps: inputting a to-be-classified special-purpose image to the machine learning model, to obtain corresponding probabilities that the inputted special-purpose image is classified to all classification labels; determining a maximum probability in the obtained probabilities; and determining that the classification fails in a case that the maximum probability is less than a threshold, and adding the inputted special-purpose image to the unclassified special-purpose image set.

In an embodiment, the computer readable instructions may cause the processor to perform the following steps when clustering the special-purpose image set, to obtain a special-purpose image subset: inputting the special-purpose images in the special-purpose image set to the machine learning model obtained after the training is ended, to obtain image features of the corresponding special-purpose images outputted by the intermediate layer of the machine learning model; and performing clustering according to the image features of the special-purpose images in the special-purpose image set, to obtain the special-purpose image subset.

In the foregoing computer readable storage medium, a machine learning model that includes a model parameter and that is obtained through training according to a general-purpose image training set is obtained, and a sample of a special-purpose image and a corresponding classification label are used to train the machine learning model. Knowledge trained according to the general-purpose image training set is migrated to a process of training according to the sample of the special-purpose image, and by adjusting the model parameter, a machine learning model with relatively high classification accuracy for the special-purpose image can be quickly trained, thereby improving the training efficiency.

A computer readable storage medium stores computer readable instructions, and when executed by a processor, the computer readable instructions implement the following steps: inputting a to-be-classified expression image to a trained machine learning model, to obtain corresponding probabilities that the inputted expression image is classified to all classification labels, where the trained machine learning model is obtained through training by using a sample of the expression image as a sample of a special-purpose image and by using the machine learning model training method; determining a maximum probability in the obtained probabilities; and classifying the to-be-classified expression image to a classification label corresponding to the maximum probability.

In the foregoing computer readable storage medium, an expression image is inputted to a trained machine learning model, a maximum probability in corresponding probabilities that the inputted expression image is classified to all classification labels is determined, and the expression image is classified to a classification label corresponding to the maximum probability, so that the machine learning model classifies the expression image, and selects the classification label corresponding to the maximum probability as a classification result, thereby improving the classification efficiency and accuracy of the expression image classification.

This application further provides a computer device. The computer device includes a processor and a memory. The memory stores at least one instruction, at least one program, and a code set or instruction set, and the at least one instruction, the at least one program, and the code set or instruction set are loaded and executed by the processor to implement the machine learning model training method provided in the foregoing method embodiment or the expression image classification method provided in the foregoing method embodiment.

This application further provides a computer readable storage medium. The storage medium stores at least one instruction, at least one program, and a code set or instruction set, and the at least one instruction, the at least one program, and the code set or instruction set are loaded and executed by a processor to implement the machine learning model training method provided in the foregoing method embodiment or the expression image classification method provided in the foregoing method embodiment.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. The storage medium may be a magnetic disc, an optical disc, a read-only memory (ROM), or the like.

Technical features in the foregoing embodiments may be combined randomly. For the brevity of description, not all possible combinations of various technical features in the foregoing embodiments are described. However, as long as combinations of these technical features do not contradict each other, it needs to be considered that the combinations all fall within the scope of this specification.

The foregoing embodiments merely describe several implementations of this application, which are described specifically and in detail, and therefore cannot be construed as a limitation to the patent scope of the present disclosure. Various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A machine learning model training method, applied to a computing device having one or more processors and memory storing a plurality of programs to be executed by the one or more processors and the method comprising:
    obtaining a machine learning model through training according to a general-purpose image training set, wherein the machine learning model comprises one or more model parameters;
    determining a sample set of special-purpose images and a corresponding classification label, further including:
        obtaining a representative special-purpose image corresponding to the classification label and an image feature of the representative special-purpose image from an intermediate layer in the machine learning model; and determining, according to similarities between the image feature of the representative special-purpose image and corresponding image features of the special-purpose images in a special-purpose image library generated by the intermediate layer in the machine learning model, a set of special-purpose images whose similarity to the representative special-purpose image exceeds a predefined threshold as the sample set of special-purpose images corresponding to the classification label;

inputting the sample set of special-purpose images to the machine learning model, to obtain an intermediate classification result for the corresponding classification label;

adjusting the model parameters of the machine learning model according to a difference between the intermediate classification result and the classification label; and repeating the inputting and adjusting steps until that a training stop condition is met, to obtain the machine learning model with the adjusted model parameters.

2. The method according to claim 1, further comprising:
before inputting the sample set of special-purpose images to the machine learning model, to obtain an intermediate classification result:
configuring a category classified by the machine learning model to match with a type of the classification label; and wherein the inputting the sample set of special-purpose images to the machine learning model, to obtain an intermediate classification result further comprises:
inputting the sample set of special-purpose images to the machine learning model, to obtain corresponding probabilities that the sample set of special-purpose images is classified to all classification labels;
determining a maximum probability in the obtained probabilities; and
using a classification label corresponding to the maximum probability as the intermediate classification result of the sample set of special-purpose images.

3. The method according to claim 1, wherein the machine learning model is a convolutional neural network model; and
the adjusting the model parameters of the machine learning model according to a difference between the intermediate classification result and the classification label further comprises:
while keeping model parameters of a specified quantity of front layers in the machine learning model to be unchanged, adjusting model parameters of layers behind the specified quantity of front layers in the machine learning model according to the difference between the intermediate classification result and the classification label until the training stop condition is met.

4. The method according to claim 1, further comprising:
obtaining an unclassified special-purpose image set determined in accordance with a determination that the machine learning model fails in classifying the unclassified special-purpose images;
clustering the special-purpose image set, to obtain a special-purpose image subset;
determining a classification label corresponding to the special-purpose image subset; and retraining the machine learning model according to the special-purpose image subset and the corresponding classification label, and the sample set of special-purpose images and the corresponding classification label.

5. The method according to claim 4, further comprising:
inputting a to-be-classified special-purpose image to the machine learning model, to obtain corresponding probabilities that the inputted special-purpose image is classified to all classification labels;
determining a maximum probability in the obtained probabilities; and
determining that the classification fails in a case that the maximum probability is less than a threshold, and adding the inputted special-purpose image to the unclassified special-purpose image set.

6. The method according to claim 4, wherein the clustering the special-purpose image set, to obtain a special-purpose image subset comprises:
obtaining, after the special-purpose images in the special-purpose image set are inputted to the machine learning model obtained after the training is ended, image features of corresponding special-purpose images outputted by an intermediate layer of the machine learning model; and
performing clustering according to the image features of the special-purpose images in the special-purpose image set, to obtain the special-purpose image subset.

7. The method according to claim 1, wherein the special-purpose image is an expression image; and the classification label is an expression classification label.

8. The method according to claim 1, wherein the training stop condition comprises:
a quantity of times of adjusting the model parameter and continuing the training reaches a preset quantity of iterations, or a classification performance index of the machine learning model with the adjusted model parameter reaches a preset index.

9. A computing device comprising one or more processors, memory coupled to the one or more processors and a plurality of programs stored in the memory that, when executed by the one or more processors, cause the computing device to perform a plurality of operations comprising:
obtaining a machine learning model through training according to a general-purpose image training set, wherein the machine learning model comprises one or more model parameters;
determining a sample set of special-purpose images and a corresponding classification label, further including:
obtaining a representative special-purpose image corresponding to the classification label and an image feature of the representative special-purpose image from an intermediate layer in the machine learning model; and
determining, according to similarities between the image feature of the representative special-purpose image and corresponding image features of the special-purpose images in a special-purpose image library generated by the intermediate layer in the machine learning model, a set of special-purpose images whose similarity to the representative special-purpose image exceeds a predefined threshold as the sample set of special-purpose images corresponding to the classification label;

inputting the sample set of special-purpose images to the machine learning model, to obtain an intermediate classification result for the corresponding classification label;

adjusting the model parameters of the machine learning model according to a difference between the intermediate classification result and the classification label; and repeating the inputting and adjusting steps until that a training stop condition is met, to obtain the machine learning model with the adjusted model parameters.

10. The computing device according to claim 9, wherein the plurality of operations further comprise:

before inputting the sample set of special-purpose images to the machine learning model, to obtain an intermediate classification result:

configuring a category classified by the machine learning model to match with a type of the classification label; and wherein the inputting the sample set of special-purpose images to the machine learning model, to obtain an intermediate classification result further comprises:

inputting the sample set of special-purpose images to the machine learning model, to obtain corresponding probabilities that the sample set of special-purpose images is classified to all classification labels;

determining a maximum probability in the obtained probabilities; and using a classification label corresponding to the maximum probability as the intermediate classification result of the sample set of special-purpose images.

11. The computing device according to claim 9, wherein the machine learning model is a convolutional neural network model; and the adjusting the model parameters of the machine learning model according to a difference between the intermediate classification result and the classification label further comprises:

while keeping model parameters of a specified quantity of front layers in the machine learning model to be unchanged, adjusting model parameters of layers behind the specified quantity of front layers in the machine learning model according to the difference between the intermediate classification result and the classification label until the training stop condition is met.

12. The computing device according to claim 9, wherein the plurality of operations further comprise:

obtaining an unclassified special-purpose image set determined in accordance with a determination that the machine learning model fails in classifying the unclassified special-purpose images;

clustering the special-purpose image set, to obtain a special-purpose image subset;

determining a classification label corresponding to the special-purpose image subset; and retraining the machine learning model according to the special-purpose image subset and the corresponding classification label, and the sample set of special-purpose images and the corresponding classification label.

13. The computing device according to claim 12, wherein the plurality of operations further comprise:

inputting a to-be-classified special-purpose image to the machine learning model, to obtain corresponding probabilities that the inputted special-purpose image is classified to all classification labels;

determining a maximum probability in the obtained probabilities; and determining that the classification fails in a case that the maximum probability is less than a threshold, and adding the inputted special-purpose image to the unclassified special-purpose image set.

14. The computing device according to claim 12, wherein the clustering the special-purpose image set, to obtain a special-purpose image subset comprises:

obtaining, after the special-purpose images in the special-purpose image set are inputted to the machine learning model obtained after the training is ended, image features of corresponding special-purpose images outputted by an intermediate layer of the machine learning model; and performing clustering according to the image features of the special-purpose images in the special-purpose image set, to obtain the special-purpose image subset.

15. The computing device according to claim 9, wherein the training stop condition comprises:

a quantity of times of adjusting the model parameter and continuing the training reaches a preset quantity of iterations, or a classification performance index of the machine learning model with the adjusted model parameter reaches a preset index.

16. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

obtaining a machine learning model through training according to a general-purpose image training set, wherein the machine learning model comprises one or more model parameters;

determining a sample set of special-purpose images and a corresponding classification label, further including:

obtaining a representative special-purpose image corresponding to the classification label and an image feature of the representative special-purpose image from an intermediate layer in the machine learning model; and determining, according to similarities between the image feature of the representative special-purpose image and corresponding image features of the special-purpose images in a special-purpose image library generated by the intermediate layer in the machine learning model, a set of special-purpose images whose similarity to the representative special-purpose image exceeds a predefined threshold as the sample set of special-purpose images corresponding to the classification label;

inputting the sample set of special-purpose images to the machine learning model, to obtain an intermediate classification result for the corresponding classification label;

adjusting the model parameters of the machine learning model according to a difference between the intermediate classification result and the classification label; and repeating the inputting and adjusting steps until that a training stop condition is met, to obtain the machine learning model with the adjusted model parameters.

* * * * *